P. N. LANDINE.
FRICTION HINGE FOR WIND SHIELDS.
APPLICATION FILED JULY 13, 1911.

1,007,708.

Patented Nov. 7, 1911.

2 SHEETS—SHEET 1.

Witnesses:
Fred K. M. Dannenfelser
Chas. A. Pardy

Inventor
P. N. LANDINE
By his Attorneys

P. N. LANDINE.
FRICTION HINGE FOR WIND SHIELDS.
APPLICATION FILED JULY 13, 1911.
1,007,708.
Patented Nov. 7, 1911.
2 SHEETS—SHEET 2.
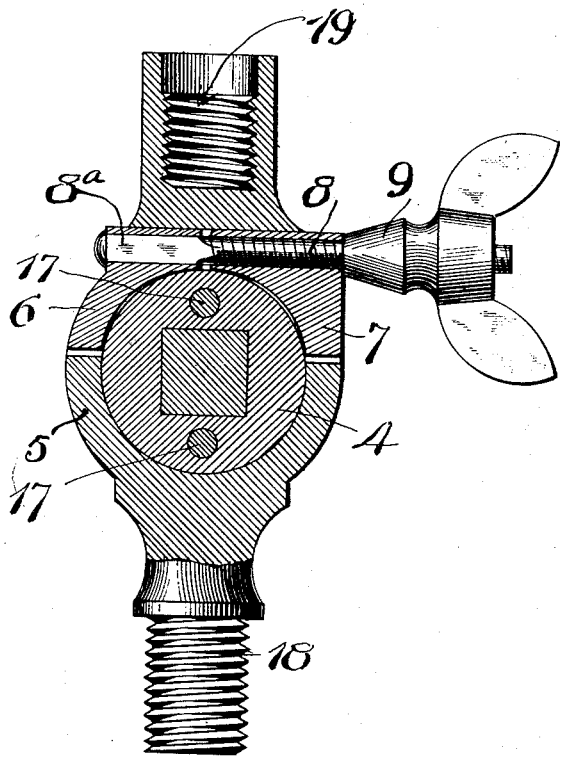
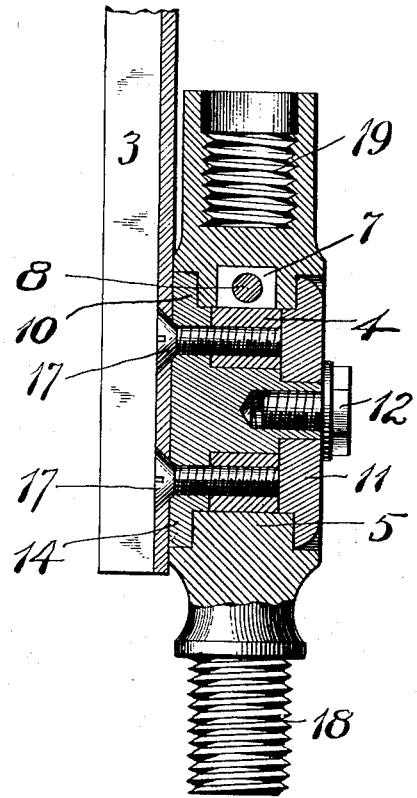
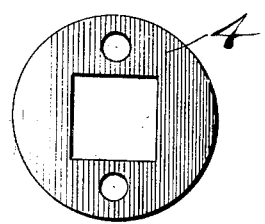
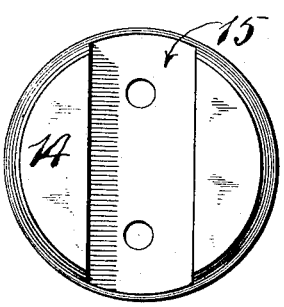
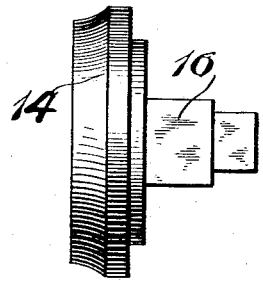
Witnesses:
Inventor
P. N. LANDINE
By his Attorneys

UNITED STATES PATENT OFFICE.

PETER N. LANDINE, OF MILFORD, CONNECTICUT, ASSIGNOR TO THE ROSTAND MFG. COMPANY, OF MILFORD, CONNECTICUT, A CORPORATION OF CONNECTICUT.

FRICTION-HINGE FOR WIND-SHIELDS.

1,007,708.

Specification of Letters Patent.

Patented Nov. 7, 1911.

Application filed July 13, 1911. Serial No. 638,255.

*To all whom it may concern:*

Be it known that I, PETER N. LANDINE, a citizen of the United States, residing at Milford, county of New Haven, State of Connecticut, have invented certain new and useful Improvements in Friction-Hinges for Wind-Shields, of which the following is a full, clear, and exact description.

My invention relates to improvements in adjustable wind shields for automobiles, and particularly to an adjustable hinge connection whereby a movable element of the wind shield may easily and conveniently be adjusted at any desired angle.

In devices of this character it is most essential that the parts be capable of withstanding severe usage, not alone because of the heavy strains due to wind pressure, but also due to the excessive vibration to which such devices are subjected.

Figure 1:
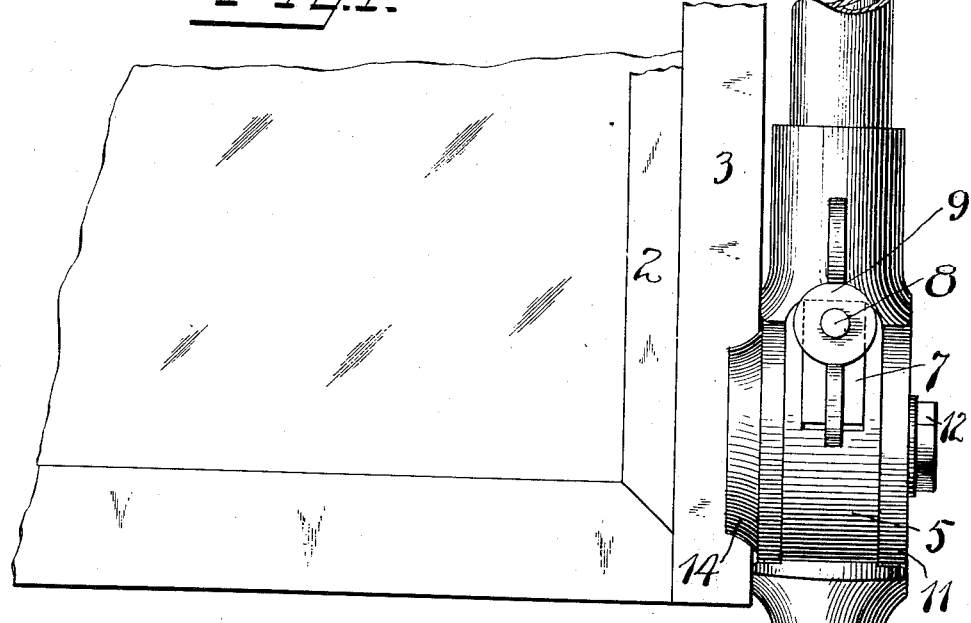
Figure 7:
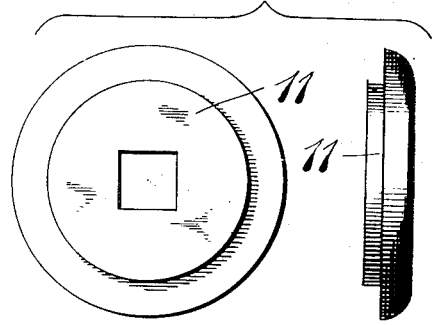
Figure 8:
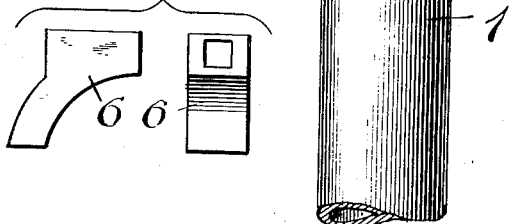
Figure 9:
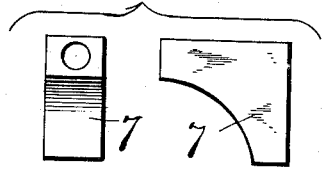

In the accompanying drawings, Figure 1 is a front elevation of part of a wind shield. Fig. 2 is a vertical section through the joint. Fig. 3 is a similar sectional view taken at right angles to the plane of the section of Fig. 2. Figs. 4 to 9 inclusive, are views illustrating details.

1 represents a supporting rod or standing part.

2 represents the frame of the glass portion of the wind shield, which in this instance constitutes the swinging or adjustable part of said shield.

3 represents a channeled side bar for the frame 2. In this particular instance the frame 2 may represent the upper part of the wind shield, it being desirable to provide means whereby the angle of said part may be varied. To that end I provide on the side bar 3 a barrel-like extension or hub 4, which may be rigidly secured to the side bar 3 in any desired manner.

The upper end of the supporting rod 1 is provided with a head 5 bored to snugly receive the hub 4. The head 5 is cut through from edge to edge and in line with the circumference of the hub 4 to afford guide passages for clamping blocks 6—7, which are so shaped as to fit into said guide passages and to so conform to the outside of the head 5 as to not impair the design thereof.

8 is a screw-bolt or the like, which extends through passages in the blocks 6—7. One end of the screw 8 may be squared, as at $8^a$, so that it will not turn in either block when the same are being drawn up.

9 is a wing nut mounted on the exposed threaded end of the screw 8. The screw 8 passes through the blocks in a plane outside of the hub 4 so as not to interfere with the rotation of the hub in the head 5. When the blocks 6—7 are released by unscrewing the wing nut 9, it is obvious that the hub 4 may be turned, whereby the side bar 3 may be adjusted at any desired angle. When so adjusted, the operator, by simply turning up on the wing nut 9, may draw the blocks 6—7 into gripping contact with the hub so as to securely hold the latter and the side bar 3 against movement. The hub 4 has at its inside by preference a flange 10, against which the adjacent side of the head 5 may bear. The opposite end of the hub is provided with a flanged cap 11, which may be secured to the hub by means of a screw 12. The flange of this cap 11 lies against the opposite side of the head 5 so as to prevent side motion.

In the preferred construction, the means for holding the side bar 3 to the hub 4 may comprise a block 14 having a slot 15 therein arranged to receive the side bar, and also having extending from its other side a squared extension 16. In this instance, the hub 4, as shown in Fig. 4, is a relatively heavy disk-like member having a squared passage arranged to overstand the squared part 16 and having screw-threaded passages arranged to receive screws 17—17, which pass through the channeled side bar 3 and engage therewith, so as to clamp the several parts of the hub tightly and permanently to said side bar. The particular form of the support or standard 1 may be varied as desired. In this particular instance, the standard 1 is an internally threaded tube screwing on to a threaded extension 18 on the lower end of the head 5. The upper end of the head 5 is provided with an internally screw-threaded bore 19, which is arranged to receive an upright, when the use of an upright extension is desired. These connections may, of course, be modified and varied at will, and, indeed, in some instances one of said extensions 18 or 19 may be omitted, depending, of course, upon the particular design of the wind shield.

What I claim is:

1. In a hinge for wind shields, a supporting part and an adjustable swinging part, a hinged connection between said parts, said hinge connection comprising a head on one part having a circular bore or passage therethrough, a hub on the other part fitted to the said bore or passage and arranged to stand therein, a second passage through said head at right angles to the first mentioned passage therein and intersecting the same eccentrically, a wedge-shaped friction block movable in said eccentric passage and guided by the walls thereof and arranged to engage the periphery of the hub, and means for drawing said friction block into binding contact with said hub.

2. In a hinge for wind shields, a supporting part, a swinging part, a hinged connection between the two, said hinged connection comprising a head on the standing part, a hub on the swinging part, a passage in the head to receive said hub, said head having another passage eccentric to the center of the hub passage, wedge-shaped hub gripping blocks in said eccentric passage, and a manually operable clamp for said blocks.

3. In a hinge for wind shields, a supporting part, a swinging part, a hinged connection between the two, said hinged connection comprising a head on the standing part, a hub on the swinging part, a passage in the head to receive said hub, said head having another passage eccentric to the center of the hub passage, wedge-shaped hub gripping blocks in said eccentric passage, and a manually operable clamp for said blocks, said clamp comprising a screw bolt passing freely through said wedge blocks, but held against rotation therein, and an operating nut for the outer threaded end of said screw.

PETER N. LANDINE.

Witnesses:
HOWARD E. KILBORN,
FANNIE MAGUINN.